(12) United States Patent
Haskell

(10) Patent No.: US 7,543,698 B2
(45) Date of Patent: Jun. 9, 2009

(54) ARTICLE ELEVATOR

(75) Inventor: David F. Haskell, Lombard, IL (US)

(73) Assignee: Container Handling Systems, Inc., Countryside, IL (US)

( * ) Notice: Subject to any disclaimer, the term of this patent is extended or adjusted under 35 U.S.C. 154(b) by 23 days.

(21) Appl. No.: 11/786,835

(22) Filed: Apr. 13, 2007

(65) Prior Publication Data

US 2008/0253873 A1 Oct. 16, 2008

(51) Int. Cl.
*B65G 17/12* (2006.01)

(52) U.S. Cl. ............... 198/801; 198/419.3; 198/460.1; 198/698; 198/607

(58) Field of Classification Search ............ 198/419.3, 198/626.1–626.6, 716, 801, 607
See application file for complete search history.

(56) References Cited

U.S. PATENT DOCUMENTS

| 1,056,665 | A | * | 3/1913 | Gubrud | 56/108 |
|---|---|---|---|---|---|
| 2,792,926 | A | | 5/1957 | Borrowdale | |
| 3,845,852 | A | | 11/1974 | Langen et al. | |
| 3,881,590 | A | * | 5/1975 | Harrtmann | 198/626.4 |
| 4,036,355 | A | | 7/1977 | Valli | |
| 4,225,034 | A | * | 9/1980 | Sarovich | 198/607 |
| 4,364,466 | A | | 12/1982 | Mojden | |
| 4,411,353 | A | | 10/1983 | McDole | |
| 4,425,995 | A | * | 1/1984 | Blattermann et al. | 198/605 |
| 4,482,139 | A | | 11/1984 | Killer | |
| 4,629,063 | A | * | 12/1986 | Hodlewsky et al. | 198/853 |
| 4,638,903 | A | | 1/1987 | Kimura | |
| 4,664,251 | A | | 5/1987 | Gough | |
| 4,724,946 | A | | 2/1988 | Cinotti | |
| 4,934,510 | A | | 6/1990 | Lutgendorf | |
| 5,167,839 | A | * | 12/1992 | Widmer et al. | 210/784 |
| 5,174,430 | A | | 12/1992 | Ebira | |
| 5,186,310 | A | * | 2/1993 | Winchester | 198/626.5 |
| 5,211,278 | A | * | 5/1993 | Mendenhall | 198/626.4 |
| 5,435,433 | A | * | 7/1995 | Jordan et al. | 198/626.5 |
| 5,849,183 | A | * | 12/1998 | Ota et al. | 210/167.02 |
| 5,893,701 | A | | 4/1999 | Pruett | |
| 6,182,814 | B1 | | 2/2001 | Koehler | |
| 6,585,262 | B2 | | 7/2003 | Nakanishi | |
| 6,755,606 | B2 | | 6/2004 | Luebben et al. | |
| 6,945,530 | B2 | | 9/2005 | Cinotti et al. | |
| 2006/0207861 | A1 | * | 9/2006 | Heimsoth | 198/607 |
| 2008/0053796 | A1 | * | 3/2008 | DePaso et al. | 198/801 |

* cited by examiner

*Primary Examiner*—Mark A Deuble
(74) *Attorney, Agent, or Firm*—Anthony S. Zummer

(57) ABSTRACT

The present invention relates to an article elevator for moving lightweight open ended containers from a first level to a second level vertically spaced from the first level. The article elevator includes an input section at the first level for receiving container bodies. An elevator section is positioned for receiving container bodies from the input section. A discharge section is located at the second level for receiving container bodies from the elevator section. A plurality of arms is movably mounted above the input section, the elevator section, and the discharge section. Each of the arms moves a group of container bodies from the input section over the elevator section to the discharge section so that successive groups of container bodies are moved to the discharge section from the input section.

6 Claims, 7 Drawing Sheets

ARTICLE ELEVATOR

BACKGROUND OF THE INVENTION

Cans which are used as closed vessels for containing soft drinks, water, beer, and the like are typically made of a container body which is a unitary drawn open ended body. A top is sealingly mounted on the open end of the body to complete the can. The top contains an apparatus for opening the can to access the contents thereof. The container body is generally made of an easily drawable material such as an aluminum alloy. Typically a slug is stamped out of the aluminum alloy sheet. The slug is positioned over a mandrel and the slug is then drawn on the mandrel utilizing oil and water as a lubricant in the drawing process to produce a lightweight unitary body. Once the body is formed, the body is cut at the open end to insure that all of the container bodies have a uniform height for the packaging process and the addition of the top. Inasmuch as the bodies are drawn with oil and water used as a lubricant, the formed bodies must be washed to clean the bodies to make them acceptable for receipt of products to be consumed by humans. The washers for the formed bodies are located at a raised location in typical can operation. An ordinary distance from the site for formation of the bodies to the washer is approximately 24 feet requiring the bodies to be raised to the washer. The apparatus heretofore used for raising the bodies is a vacuum system. The bodies with the closed end uppermost are moved to a conveyor where air pressure is reduced so that the closed ends of the container bodies are held onto the conveyor. The conveyor raises the container bodies to the washer. Inasmuch as a normal production of container bodies may be approximately 1,600 container bodies per minute, it is apparent that the container bodies must move quickly and a large quantity of air is required to hold the container bodies onto the conveyor.

The flow of air which holds the container bodies onto the conveyor also removes lubricating oil and water from the container bodies. A separate air treating system is required to collect the oil and water rather than discharge the oil and water into the atmosphere. The capital cost of the air treating system and the operation of the necessary blowers for the conveyor and the air treating system is expensive, in that, they consume a considerable amount of energy in the operation of all of the air handling equipment.

SUMMARY OF THE INVENTION

The present invention is an improved article elevator. The elevator is particularly adapted to handle unitary open ended lightweight container bodies used in the manufacture of cans. The container bodies are raised from a first level to a vertically spaced second level. The first level has an input section for receiving lightweight container bodies. The elevator includes an elevator section having an elevator input end for receiving lightweight container bodies from the input section. The elevator includes a discharge section at the second level for receiving lightweight container bodies from the elevator section. A plurality of first arms is movable above the input section, the elevator section, and the discharge section to move successive groups of lightweight container bodies from the input section over the elevator section to the discharge section. Each of the arms moves a group of container bodies thereby successive groups of lightweight container bodies are moved from the input section over the elevator section to the discharge section to effect a change of elevation for the lightweight container bodies from the first level to the second level.

BRIEF DESCRIPTION OF THE DRAWINGS

FIG. 4 is an end view of the container body elevator shown in FIG. 1 showing groups of containers in pockets moved on an elevator section of the elevator;

DETAILED DESCRIPTION OF THE PREFERRED EMBODIMENT

Figure 1:
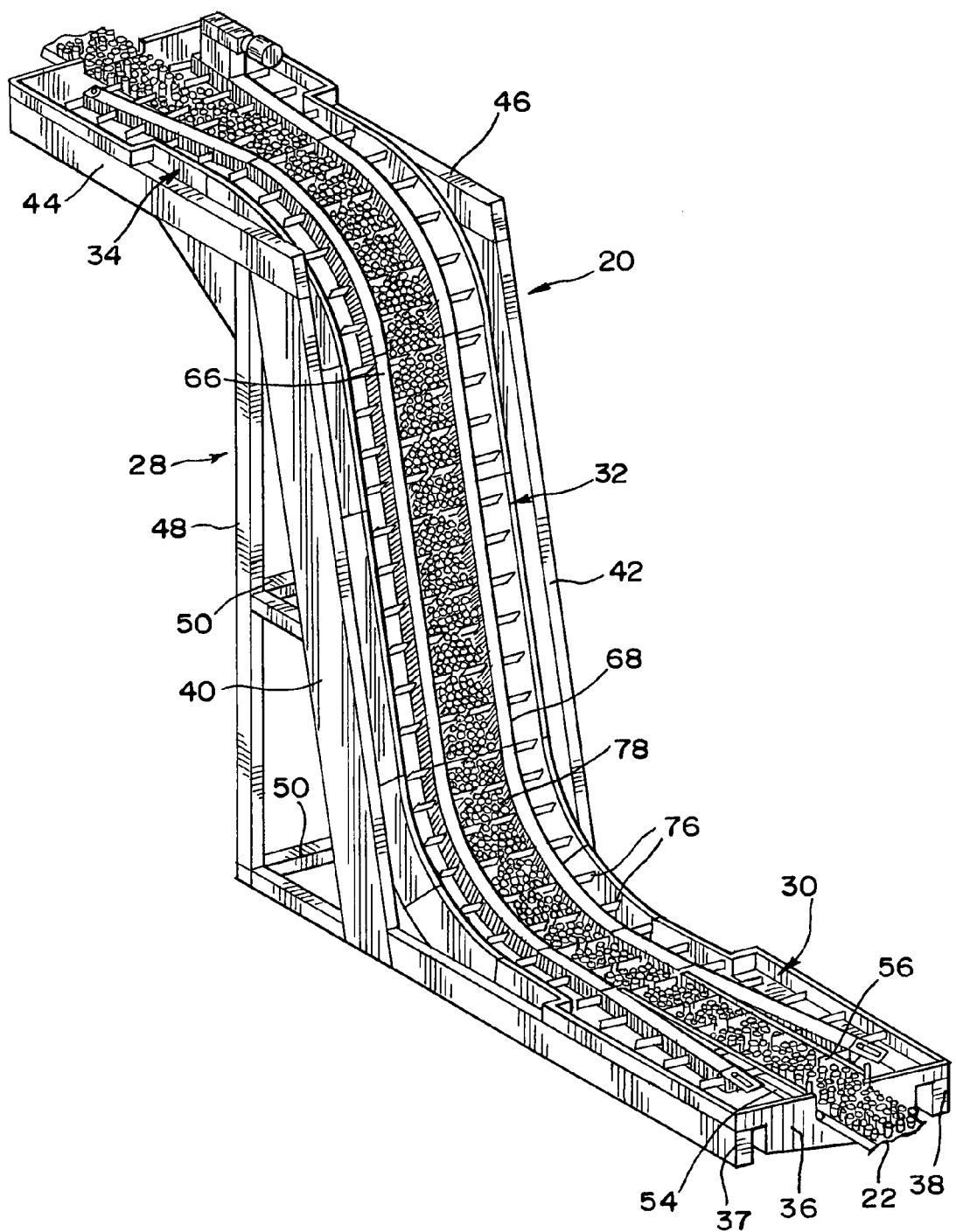
FIG. 1 is a perspective view of a container body elevator embodying the herein disclosed invention for raising lightweight container bodies from a first level to a second higher level.
Figure 2:
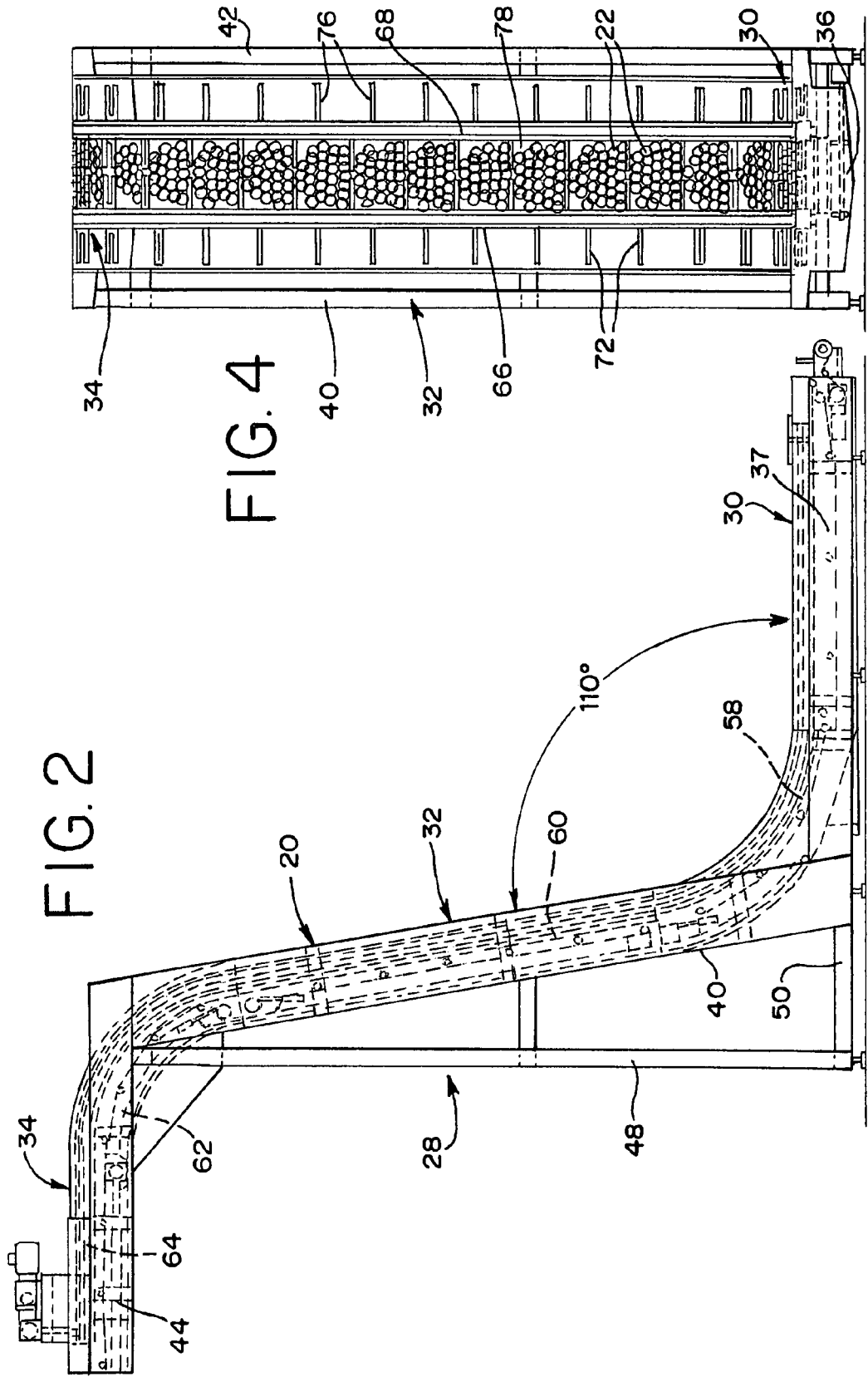
FIG. 2 is a side elevational view of the container body elevator shown in FIG. 1 showing the difference in heights from a first level to a second level.
Figure 11:
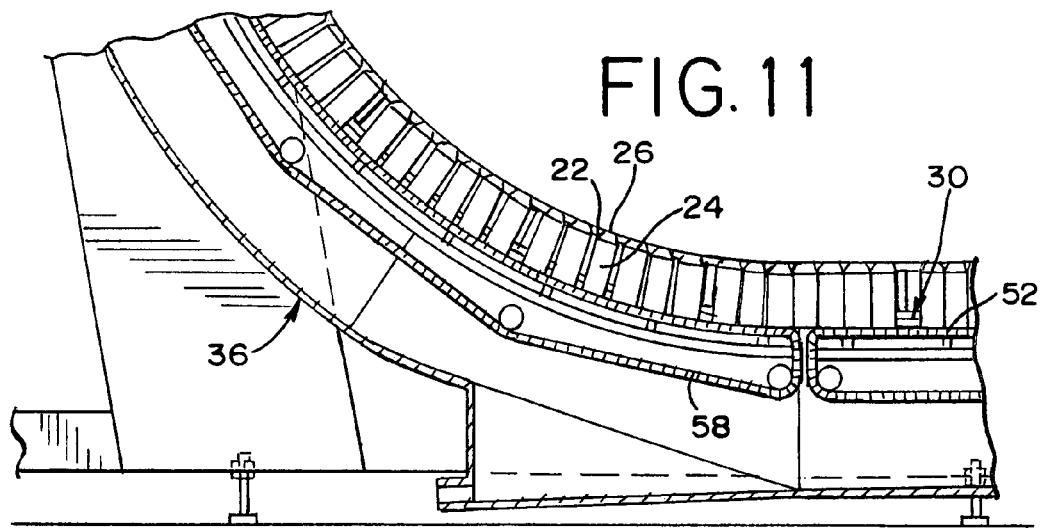
FIG. 11 is a cross sectional view of the elevator through a transition portion from the input section to the elevator section.

Referring now to the drawings, and especially to FIG. 1, an article elevator which is a specific embodiment of the present invention is shown therein and is generally identified by the numeral 20. Article elevator 20, in this instance, is used to handle conventional lightweight drawn open ended aluminum alloy container bodies 22. Each container body 22 has an identical construction to each other container body. Each container body 22 has a right circular cylindrical sidewall 24 with an integrally formed bottom 26 and an open end opposite the bottom. The instant container body is a conventional and well known construction for use as a main body of a conventional and well known metal can which is ubiquitous throughout the country. The present elevator handles the container bodies with the bodies oriented in an attitude wherein the open end of each body is on the support for each body, as shown in FIG. 11. The orientation of the bodies allows lubricant used in the drawing process and residually carried by the bodies to run out of the bodies during the elevating process, thereby reducing the amount of residue required to be removed by a washing process.

Article elevator 20 includes a frame 28 with an input section 30 positioned at one end of the frame. An elevator section 32 is mounted on the frame with one end positioned adjacent to the input section. A discharge section 34 is also mounted on the frame and is positioned adjacent to another end of the elevator section. The discharge section, in this instance, is at a level twenty-four feet above the level of the input section. A drip pan 36 is mounted on the frame and extends the length of the frame beneath the input section, the elevator section, and the discharge section. The article elevator raises groups of open ended container bodies 22 from the input section to the discharge section where the bodies are discharged from the article elevator.

Frame 28 includes base sides 37 and 38 which have input section 30 secured thereto. Elevator supports 40 and 42 are connected to base sides 37 and 38, respectively. Elevator section 32 is attached to elevator supports and 40 and 42. Discharge section 34 is mounted on discharge beams 44 and 46 which are secured at their respective end to supports 40 and 42, respectively. Uprights 48 in cooperation with cross member 50 provide stability to frame 28.

Input section 30 includes a movable horizontal input surface specifically a conventional apertured conveyor input belt 52 which is driven by a conventional controlled source of power. The input section receives container bodies from one or more conventional body forming machines (not shown). A pair of parallel guide rails 54 and 56 keep container bodies 22 on the conveyor input belt when received from the forming machines. Bodies 22, as mentioned above, are each formed from a slug of aluminum alloy and drawn over a mandrel to form a unitary container body. Oil and water are used as lubricants during the forming process so that each of the container bodies arrives at the input section with some residue of oil and water on each body. The bodies are positioned on input belt 52 with the open ends of the bodies adjacent to the belt. The oil and water tend to run down the bodies to the belt. The apertures in the belt allow the oil and water to pass through the belt to the drip pan. The input belt 52 has its upper surface in a horizontal plane which forms a first level. The input belt extends to a lower apertured transfer conveyor belt 58 for carrying container bodies from the input section to the elevator section. Transfer belt 58 is driven by a conventional controlled power source at a rate comparable to the speed of the input belt so that there is a smooth transition by the container bodies from the input belt to transfer belt 58.

The elevator section has a movable elevator surface specifically a conventional apertured conveyor elevator belt 60 driven by a conventional controlled power source. Elevator belt 60 is driven at a speed comparable with the speed of transfer belt 58 to have a smooth transfer of container bodies to the input end of the elevator section. The elevator belt is set at an angle of 110° to the upper horizontal surface of input belt 52. The angle of the elevator belt allows for maximum amount of vertical lift of the container bodies for the minimum amount of utilized horizontal space, but in keeping with the requirement to maintain the attitude of the bodies in an upright position relative to the belts. The elevator conveyor belt has a discharge end positioned adjacent to one end of an apertured upper transfer conveyor belt 62 which is driven by a conventional controlled power source. Transfer belt 62 is driven at a rate to receive container bodies from the elevator belt. The discharge section has a movable horizontal discharge surface specifically an apertured discharge conveyor belt 64. Belt 64 has one end positioned adjacent to the upper transfer belt to receive container bodies from the upper transfer belt. The discharge belt is driven by a conventional controlled source of power at a speed greater than the speed of the upper transfer belt and effectively faster than all the belt carrying the container bodies including the input belt. Discharge conveyor belt 64 has its upper surface in a horizontal plane parallel to the upper surface of input belt 52.

A first arm conveyor 66 is mounted on one side of the input section, the elevator section, and the discharge section. A mirror image second arm conveyor belt 68 is mounted on the other side of the input section, elevator section, and discharge section. The first arm conveyor 66 includes a chain belt 70 with a plurality of identical first arms 72 mounted thereon. Each of the first arms is extendable successively over the input section, the elevator section, and the discharge section to the middle of each section and then return to the input section. The second arm conveyor belt includes a like conventional chain conveyor 74 with a plurality of identical second arms 76 mounted thereon. In a like manner to the first arm, end of the second arms 76 is extendable successively over the input section, the elevator section, and the discharge section to the middle of each section and then return to the input section.

Figures 3, 5:
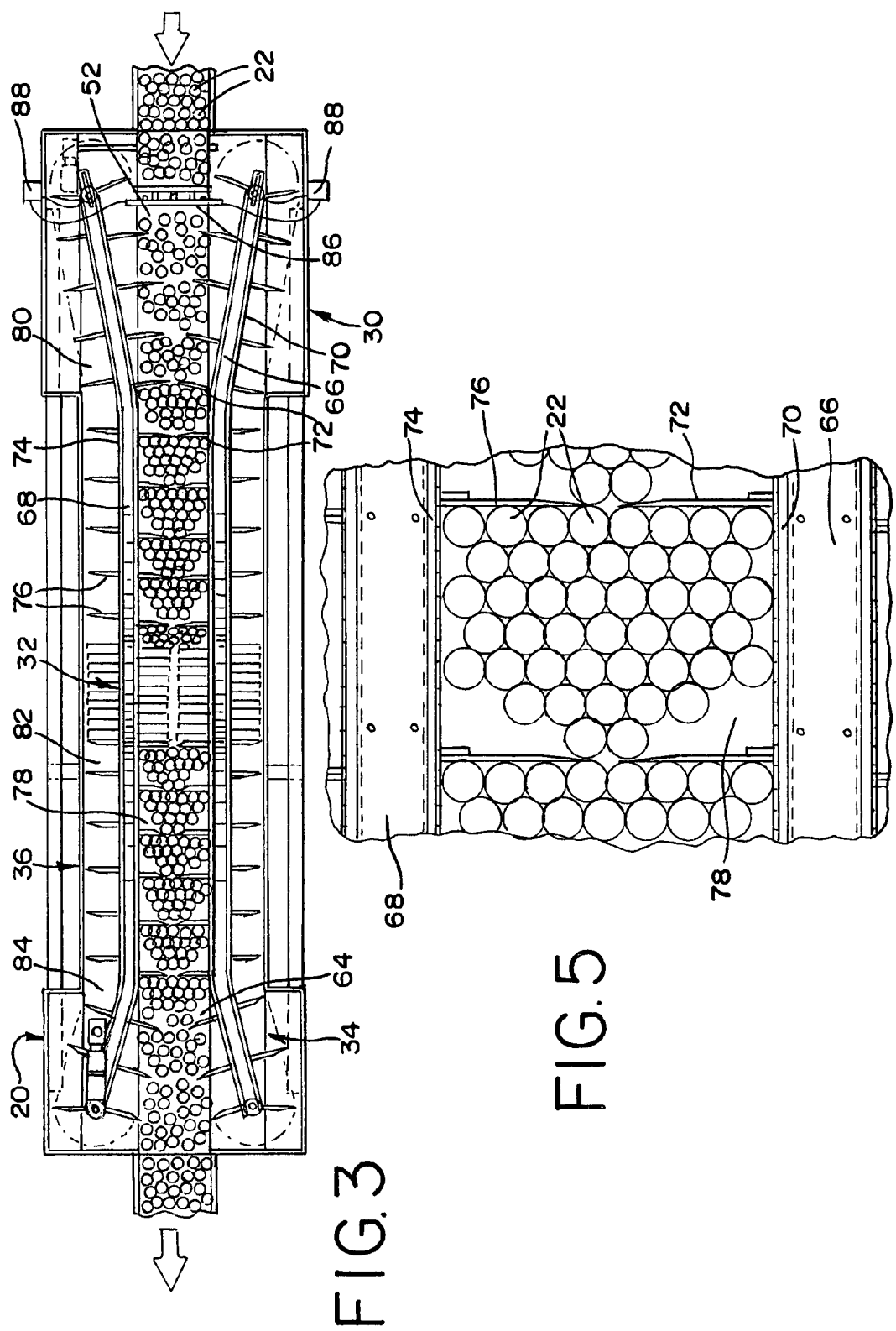
FIG. 3 is a top view of the container body elevator shown in FIG. 1 showing groups of containers in separate pockets.
FIG. 5 is an enlarged top view of a pocket formed by a pair of push arms with an assembly of container bodies held in the pocket.
Figure 6:
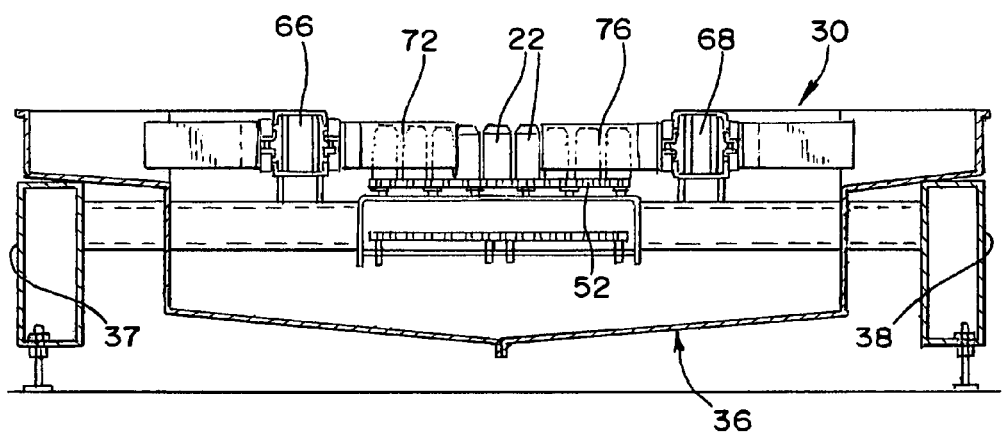
FIG. 6 is a cross sectional view taken on Line 6-6 of FIG. 8 showing converging arms before completing a pocket and a drip pan for collecting lubricant dropped off the container bodies.
Figure 7:
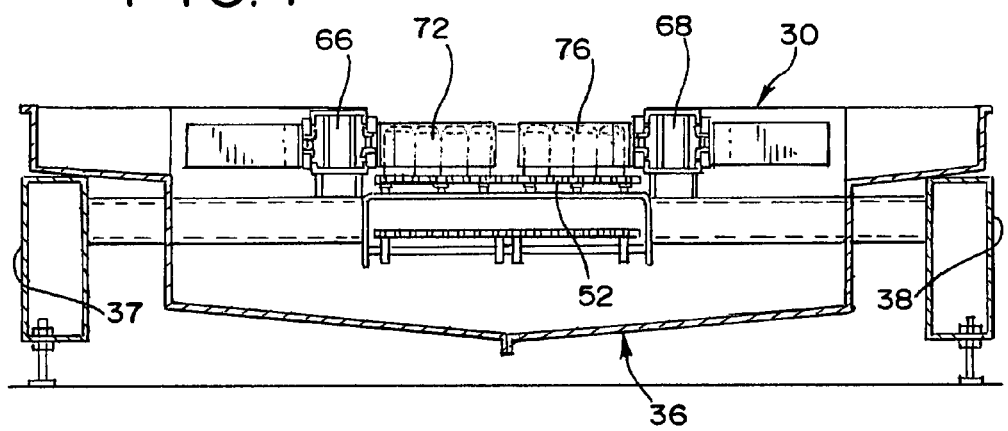
FIG. 7 is a cross sectional view taken on Line 7-7 of FIG. 8 similar to FIG. 6, but showing a pair of arms forming a complete pocket.
Figure 8:
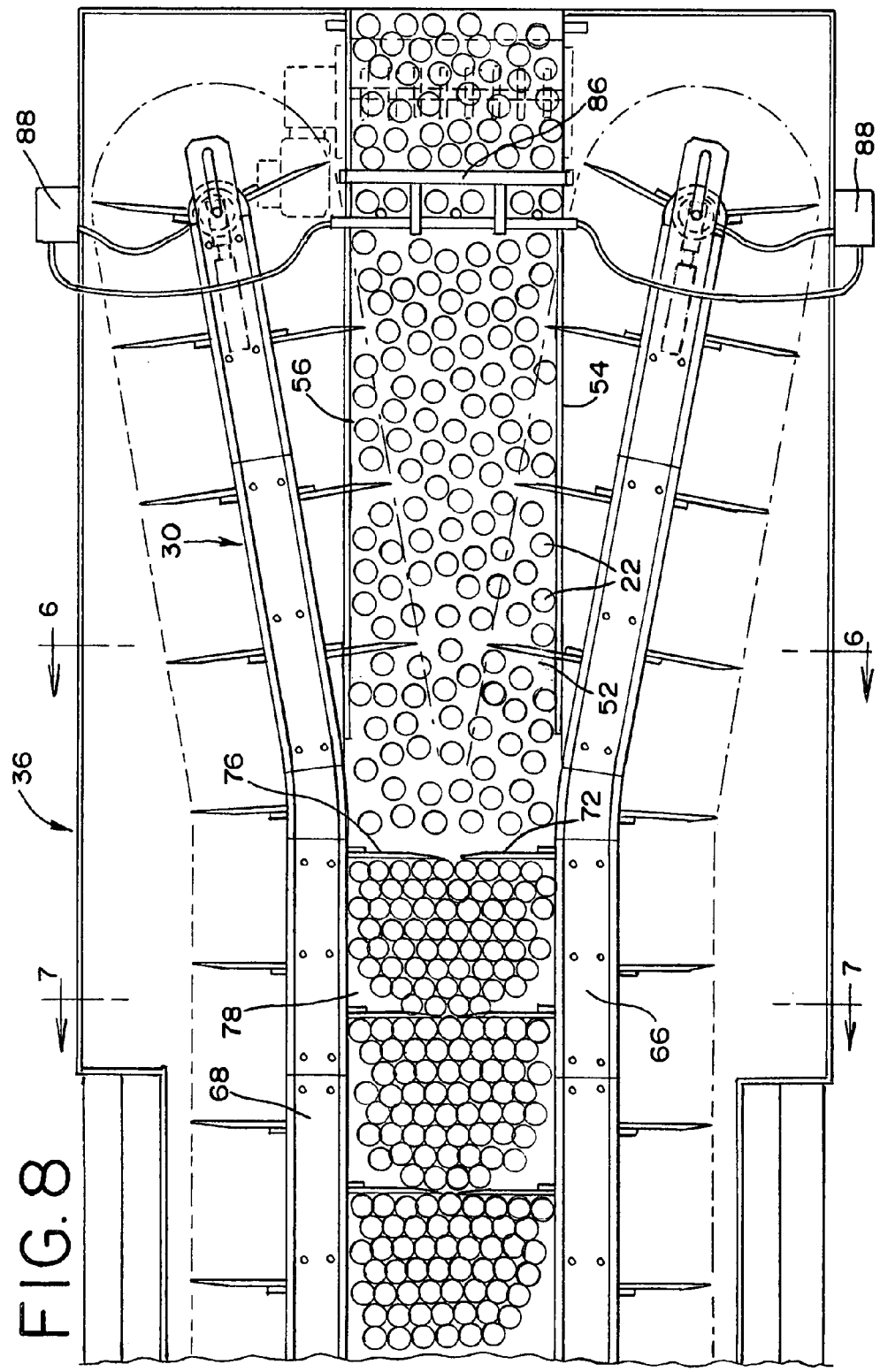
FIG. 8 is an enlarged top view of an input section of the container body elevator showing push arms being moved into a group of container bodies to form pockets for holding the container bodies in a stabilized attitude as the bodies are moved through the elevator system from the first level to the second level.
Figure 9:
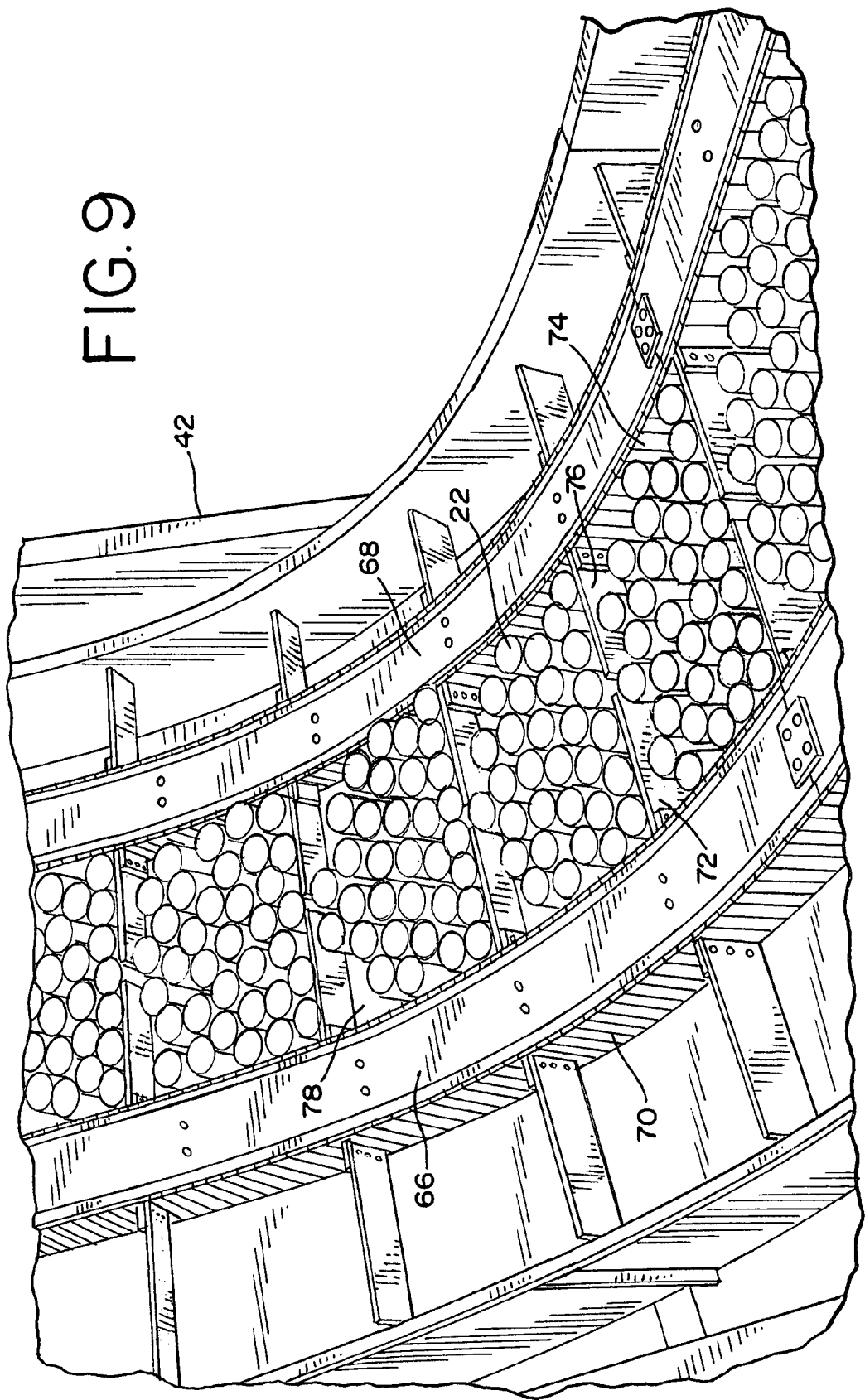
FIG. 9 is an enlarged perspective view of a portion of the elevator showing pockets of container bodies moving from an input section to an elevator section.
Figure 10:
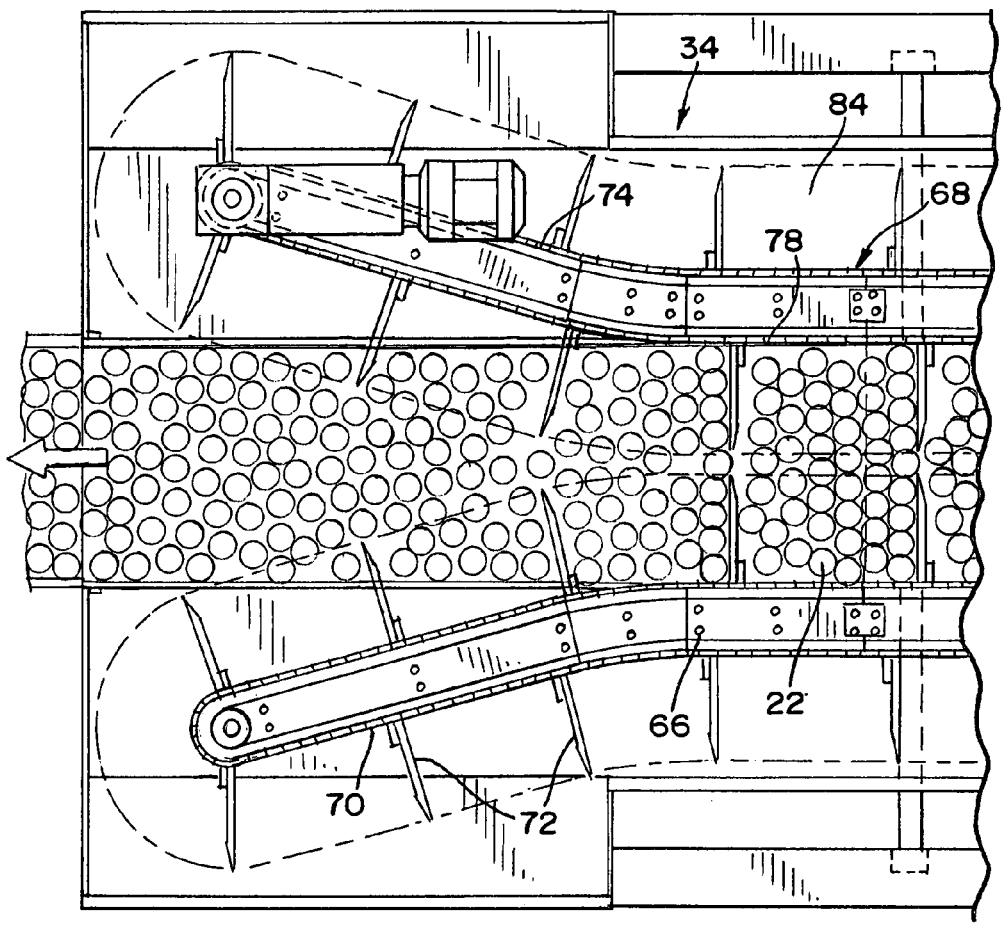
FIG. 10 is an enlarged top view of the elevator showing a discharge section wherein the arms are moved away from the container bodies to allow the container bodies to be discharged from the elevator after being raised from the first level to the second level.

As may be best seen in FIG. 8, the first and second arm conveyor belts converge over the input section. The first and second arms are positioned adjacent to each other at their outer most ends after the conveyors converge to form conveyor arms forming pockets 78 for receiving a group of container bodies in each of the pockets. Each of the pockets with container bodies in the respective pocket is moved up the elevator section to the discharge section where the first and second arm conveyors diverge, as shown in FIGS. 3 and 10.

The container bodies are delivered to the input belt of the input section from the forming machines (not shown). The container bodies are typically delivered at the rate of 1,600 container bodies per minute. The container bodies are loaded onto the input belt with the open end of each of the container bodies extending downward, that is, adjacent to the inlet belt so that residue of the oil and water lubricants may flow off the container bodies and to the apertured belt which allows the lubricants to flow through the belt to the drip pan. The drip pan has an input portion 80 below the input section, an elevator portion 82 adjacent to the elevator section, and a discharge portion 84 below the discharge section. The lubricant which comes off the container bodies while the bodies are on the elevator passes through the apertured belts and is collected in the drip pan for disposal. The first and second arms converge over the input section, as may be best seen in FIGS. 3 and 8. Each pair of juxtaposed ends of the first and second arms forms a pocket 78. The container bodies are delivered in sufficient numbers to substantially fill each pocket with container bodies so that there is a massed assembly of container bodies. The successive pockets with the container bodies are moved to the elevator section. The pockets with the container bodies move up the elevator section to the level of the discharge section. At the discharge section, the arms diverge, as shown in FIGS. 3 and 10, to allow the container bodies to be carried away by the discharge belt. The speed of the discharge belt is greater than the speed of the other belts of the elevator including the input belt of the input conveyor and the speed of the first and second arm conveyor so that the container bodies clear the arms and are carried away for further processing. Typically, the container bodies are delivered to a washer (not shown) for washing the container bodies to make the bodies acceptable for receipt of products for human consumption.

The pockets carrying the container bodies are substantially filled with the container bodies adjacent to the first and second arms to keep the container bodies upright during the transfer from the lower level to the upper level. A scanner 86 is mounted above the input section to determine the density of the mass of numbers of the container bodies entering the input section. The scanner is connected to a motor control 88 which regulates the rate of movement of all of the belts and the first arm and second arm conveyors. The control regulates the speed of the belts and first and second arm conveyors to keep enough container bodies in the input section so that each of the successive pockets formed by first and second arms is filled, but the input section is not overloaded. Thus, the filled pockets prevents the container bodies from falling over, but rather in an upright attitude from the input section to the discharge section and the container bodies are delivered from the elevator in an upright attitude for further processing.

Although the invention has been described in detail above, it is readily apparent that those skilled in the art may make various modifications and changes in the instant invention without departing from the spirit and scope of the present invention. It is to be expressly understood that the instant invention is limited only by the appended claims.

What is claimed is:

1. An article elevator for moving lightweight open ended container bodies from a first level to a vertically spaced second level comprising;
   an input section at the first level for receiving container bodies, an elevator section for receiving container bodies from the input section,
   a discharge section at the second level for receiving container bodies from the elevator section,
   and a plurality of first arms,
   each of said first arms being movable above the input section, the elevator section and the discharge section to move a group of container bodies from the input section over the elevator section to the discharge section thereby moving successive groups of container bodies from the input section over the elevator section to the discharge section,
   including a sensor measuring the mass of assembly of container bodies at the input section,
   and a control connected to the sensor to regulate movement of the arms to maintain an assembly of container bodies adjacent to each of said arms at the input section.

2. An article elevator for moving lightweight open ended container bodies from a first level to a vertically spaced second level comprising;
   an input section at the first level for receiving container bodies, an elevator section for receiving container bodies from the input section,
   a discharge section at the second level for receiving container bodies from the elevator section,
   and a plurality of first arms,
   each of said first arms being movable above the input section, the elevator section and the discharge section to move a group of container bodies from the input section over the elevator section to the discharge section thereby moving successive groups of container bodies from the input section over the elevator section to the discharge section,
   wherein said input section has a moveable horizontal input support surface for supporting container bodies,
   said discharge section having a movable horizontal discharge support surface substantially parallel to the horizontal input support surface,
   a sensor measuring the massed assembly of container bodies on the horizontal input support surface,
   and a control connected to the sensor to regulate movement of the arms to maintain a minimum selected number of container bodies adjacent to each of said arms.

3. An article elevator for moving lightweight open ended container bodies from a first level to a vertically spaced second level comprising;
   an input section at the first level for receiving container bodies, an elevator section for receiving container bodies from the input section,
   a discharge section at the second level for receiving container bodies from the elevator section,
   and a plurality of first arms,
   each of said first arms being movable above the input section, the elevator section and the discharge section to move a group of container bodies from the input section over the elevator section to the discharge section thereby moving successive groups of container bodies from the input section over the elevator section to the discharge section,
   including; a plurality of second arms,
   each of said second arms being movably positionable above the input section, the elevator section,
   and the discharge section,
   each of said second arms extendable toward the center of the input section, the elevator section, and the discharge section as each arm moves over each section,
   each second arm having an outer end being positionable adjacent to a respective first arm to form a conveyor pair of arms to move a massed assembly of container bodies from the input section over the elevator section to the discharge section,
   a sensor measuring the massed assembly of container bodies at the input section,
   and a control connected to the sensor to regulate the movement of the first and second arms to maintain an assembly of container bodies adjacent to said conveyor pair of arms.

4. An article elevator for moving lightweight open ended container bodies from a first level to a vertically spaced second level comprising;
   an input section at the first level for receiving container bodies, an elevator section for receiving container bodies from the input section,
   a discharge section at the second level for receiving container bodies from the elevator section,
   and a plurality of first arms,
   each of said first arms being movable above the input section, the elevator section and the discharge section to move a group of container bodies from the input section over the elevator section to the discharge section thereby moving successive groups of container bodies from the input section over the elevator section to the discharge section,
   wherein said input section has a movable horizontal input support surface for supporting container bodies,
   said discharge section having a movable horizontal discharge support surface substantially parallel to the horizontal input support surface,
   a plurality of second arms,
   each of said second arms being movably positionable above the input section, the elevator section, and the discharge section,
   each of said second arms extendable toward the center of the input section, the elevator section and the discharge section as each second arm moves over each of said sections,
   each second arm having an outer end positionable adjacent to a respective first arm to form a conveyor pair of arms to move a massed assembly of container bodies from the horizontal input support surface over the elevator section to the horizontal discharge support surface,
   a sensor for measuring the massed assembly of container bodies on the horizontal input support surface, and a control connected to the sensor to regulate movement of the arms to maintain an assembly of container bodies adjacent to each of said pair of conveyor arms.

5. An article elevator for raising lightweight inverted open ended container bodies from a first level to a second level spaced from the first level in a vertical direction, comprising;
   an input section at the first level for receiving open ended container bodies with the open end of each container body adjacent to the input section,
   an elevator section for receiving container bodies from the input section,
   a discharge section at the second level for receiving container bodies from the elevator section,
   a plurality of first arms movable above the input section, the elevator section, and the discharge section,
   a like plurality of second arms moving above the input section, the elevator section and the discharge section at the same rate as the first arms to cooperate with the first arms to form temporary pockets to move container bodies from the input section over the elevator section to the discharge section,
   wherein said first and second arms move in converging paths above the input section to create a succession of temporary pockets to carry in each pocket a number of container bodies above the elevator section,
   a sensor measuring the mass of assembly of container bodies at the input section,
   and a control connected to the sensor to regulate movement of the arms to have each pocket substantially filled with container bodies.

6. An article elevator for raising inverted open ended lightweight container bodies from a first level to a second level spaced from the first level in a vertical direction comprising;
   an input section having an input end for receiving container bodies,
   said input section having a movable horizontal input support surface defining the first level for receiving container bodies having their open ends adjacent to the input support surface,
   said input support surface being apertured to allow a liquid to pass through the input support surface,
   an elevator section having an elevator input end for receiving container bodies from the input section, the elevator section having a movable elevator surface extending upward from the horizontal input support surface at an angle greater than 90° between the elevator surface and the input support surface,
   said elevator surface being apertured to allow a liquid to pass through the elevator surface,
   a discharge section for receiving container bodies from the elevator section,
   said discharge section having a movable horizontal discharge support surface being substantially parallel to the horizontal input support surface,
   said horizontal discharge support surface being moved faster than the movement of the input support surface,
   said horizontal discharge support surface having a plurality of apertures to allow liquid to allow a liquid to pass through the discharge support surface,
   a plurality of first arms being movably positionable above the input, elevator, and discharge sections,
   each of said first arms extendable toward the center of the input section, the elevator section, and the discharge section as each first arm moves over each section,
   a like plurality of second arms being movably positioned above the input, elevator, and discharge sections,
   each of said second arms extendable toward the center of the input section, the elevator section, and the discharge section as each second arm moves over each section,
   each first arm being positionably adjacent to a respective second arm to form a conveyor pair of arms to move a massed assembly of container bodies from the horizontal input support surface over the elevator surface to the horizontal discharge support surface,
   said conveyor pairs of arms moving at a speed less than the speed of the horizontal discharge support surface,
   and a drip pan including an input portion positioned under the input section and a discharge portion positioned under the discharge section for collecting liquid from the container bodies.

* * * * *